March 24, 1942. T. C. DELAVAL-CROW 2,277,635
BEARING MOUNTING
Filed Aug. 17, 1939
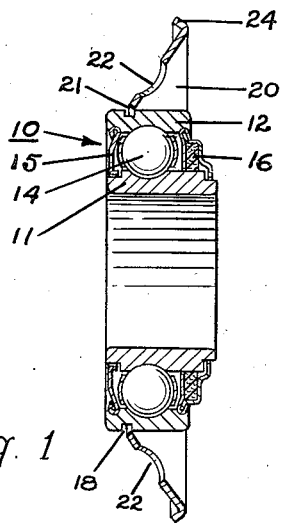
Fig. 1
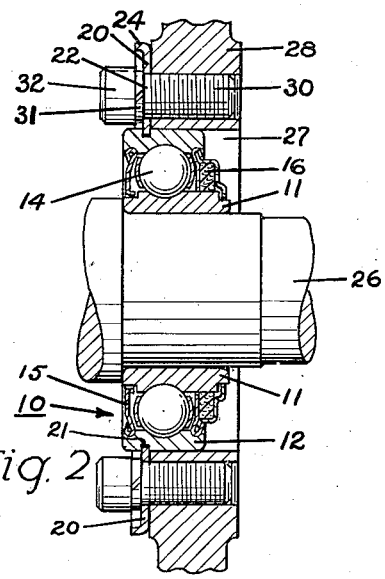
Fig. 2
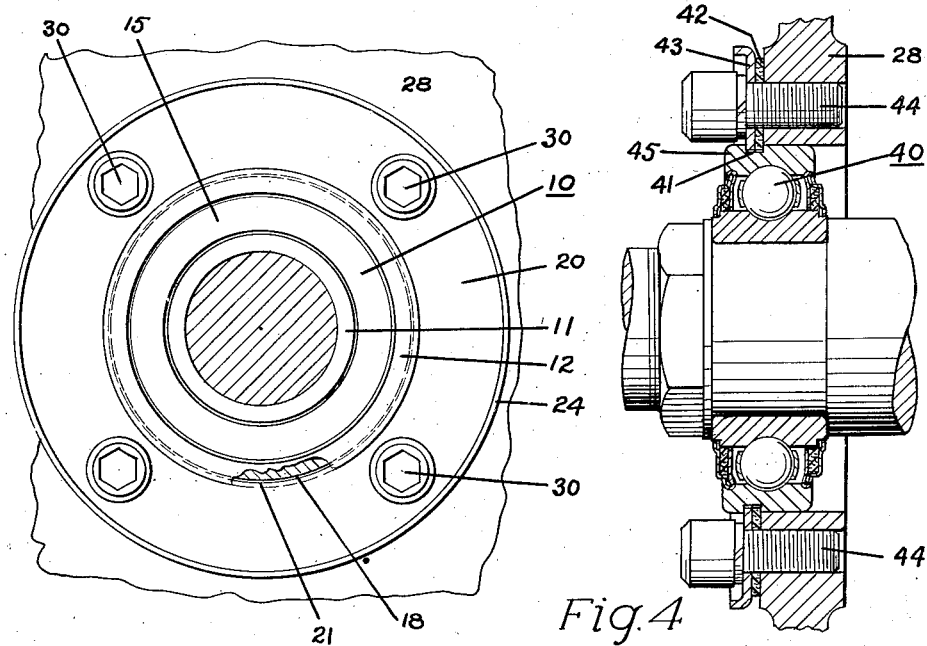
Fig. 3
Fig. 4
INVENTOR:
THOMAS C. DELAVAL-CROW,
BY
HIS ATTORNEY.

Patented Mar. 24, 1942

2,277,635

UNITED STATES PATENT OFFICE 2,277,635

BEARING MOUNTING

Thomas C. Delaval-Crow, Bristol, Conn., assignor to General Motors Corporation, Detroit, Mich., a corporation of Delaware Application August 17, 1939, Serial No. 290,622

6 Claims. (Cl. 308—22)

This invention relates to bearings and their mountings, and particularly to improvements in flanged bearing mountings. An object of my invention is to provide an improved method for mounting bearings. Another object is to provide a simply constructed flange attachment for bearings and which may be quickly and easily assembled as a part of a bearing. Another object is to provide a pliable bearing flange so reinforced that the flange may be uniformly bent from an initially dished shape to a final planar form wherein it is in unit-handling relation with a bearing member, and a further object resides in the provision of a sheet metal bearing flange and seal that may be deformed into locked sealing relation with a bearing member.

To these ends, and also to improve generally upon devices of the character indicated, my invention consists in the various matters hereinafter described and claimed.

In the accompanying drawing:

Figure 1 is a view in diametrical cross section showing my bearing flange in position to be assembled with an antifriction bearing;

Figure 2 is a diametrical cross section showing the assembled bearing and flange mounted in operative position;

Figure 3 is an end elevation of the invention; and

Figure 4 is a diametrical cross section of another embodiment of my invention.

In the illustrated embodiment of Figures 1, 2 and 3 an antifriction bearing 10, herein shown as a unit-handling ball bearing, has the inner and outer race rings 11 and 12 engaged by rolling elements, such as the balls 14 which roll in the usual raceways in the race rings. The bearing is preferably provided with the suitable shield 15 and seal 16, such as disclosed in the United States patent to Large, No. 1,917,988 and issued on July 11, 1933, to effectively close the ends of the ball chamber so that lubricant will be prevented from leakage out of this chamber and dirt, water and other deleterious substances cannot enter into the bearing.

The outer race ring 12 is peripherally grooved at 18 to receive the mounting washer or flange 20 in permanently locked relation with the bearing. This flange is first punched out from suitable ductile sheet metal in the form of a flat annulus that has a central bore 21 diametrically equivalent to, or preferably of a slightly greater diameter than the bottom diameter of the groove 18. The flange 20 has suitably located holes 22 that receive mounting means to be later described. The outer peripheral edge of the flange 20 is bent over laterally to provide the reinforcing rim 24, after which the flange is conically dished to the general shape shown in Figure 1, and this deformation of the flange 20 stretches the ductile sheet metal so that the bore 21 is sufficiently enlarged to exceed the external diameter of the outer race ring 12. The flange 20 is then located about the outer race ring 12 with the inner peripheral edges of the flange aligned with the groove 18, after which the flange is uniformly deformed back to its planar form so that the bore 21 is again reduced and the inner edges of the flange 20 are located in locked relation in the groove 18 thus securing the flange in unit-handling relation with the bearing 10. The groove 18 is preferably of such size that the flange 20 will wedge therein without causing distortion of the flange. It has been found that the reinforcing rim 24 effectively prevents the flange 20 from warping when the flange is mounted on the bearing, with the result that the flange easily deforms to a uniformly conical contour and then uniformly bends back to its planar form while the mounting holes 22 do not tend to become excessively distorted as in the case when the flange has no reinforcing rim.

The unit-handling bearing 10 is illustrated as supporting a suitable member such as a shaft 26 mounted in the inner race ring 11, and the outer race ring 12 is slidably mounted in the bore 27 of a suitable housing 28, while the screws 30, threaded in the housing, pass through the flange holes 22 and removably secure the flanged bearing assembly in operative position. If desired, spring washers 31 may be located between the flange 20 and the screw heads 32 to more securely hold the screws from loosening. The flange 20 preferably lies flat against a flat abutting face of the housing and this flange preferably fits tightly in the outer race ring 12 so that lubricant or other fluid within the housing cannot leak out around the bearing 10.

Figure 4 shows another embodiment of this invention wherein the bearing 40 is generally similarly constructed and similarly mounted in the housing 28 except that the groove 41 corresponding to the groove 18, is made wider and a sealing washer 42, composed of a pliant deformable sealing material such as felt, leather, rubber or other suitably compressible material, is also mounted in the groove 41 and clamped between the flange 43 and the housing 28 to positively prevent leakage between the bearing and the housing, it being understood, of course, that the seal 42 is suitably apertured to receive the mounting screws 44. The width of the groove 41 is preferably such that the flange 43 and the seal 42 will be wedged sufficiently tightly between the side walls of the groove so that the seal 42 within the groove will be compressed into tight sealing engagement with the outer race ring 45. It has also been found convenient to adhesively secure the seal 42 to the back of the flange 43 so that the flange and seal be simultaneously deformed as a unit into seated unit-handling relation with the outer race ring 45.

I claim:

1. In a device of the character indicated, a support provided with a flat side bearing face and having a bore laterally extending from said face, an annular bearing member received in said bore and having a peripheral groove, a substantially flat sheet metal bearing flange seated in said groove, a bent-over marginal reinforcing rim on said flange, and means demountably securing the flange in flat seated engagement on said housing; substantially as described.

2. In a device of the character indicated, a housing provided with a flat bearing engaging face and having a bore laterally extending from said face, an annular bearing member received in said bore and having a peripheral groove adjacent said face, a continuously integral sheet metal ring seated in said groove in unit handling relation with the annular bearing member, a flat house-engaging face on said ring, a laterally disposed reinforcing rim on said ring, and means for removably securing the ring to said bearing engaging face; substantially as described.

3. In a device of the character indicated, an antifriction bearing, an outer race ring for said bearing and having a peripheral groove, a continuously integral sheet metal ring wedged into seated engagement within said groove and in unit handling relation with the outer race ring, said ring being substantially planar in form, and a peripheral reinforcing rim on said ring to prevent the ring from warping; substantially as described.

4. In a device of the character indicated, a housing provided with a flat bearing engaging face and having a bore laterally extending from said face, an annular bearing member slidably received in said bore and having a peripheral groove outside of the bore and adjacent to said face, a continuously integral sheet metal ring seated in said groove in unit-handling relation with the annular bearing member and having a planar housing engaging face, a laterally disposed marginal reinforcing rim on said ring, and clamping means passing through the ring and removably engaging said housing; substantially as described.

5. In a device of the character indicated, a housing provided with a bearing engaging face and having a bore laterally extending from said face, an annular bearing member received in said bore and having a peripheral groove, a continuously integral substantially flat sheet metal ring seated in said groove in unit handling relation with the bearing member, a marginal reinforcing rim on said ring, a flat annular seal in backed relation with said ring and wedged in the groove between the ring and said bearing member, and clamping means removably securing the ring and seal to said housing; substantially as described.

6. In a device of the character indicated, a housing provided with a flat bearing engaging face and having a bore laterally extending therefrom, an annular bearing member seated in said bore and having a peripheral groove, a continuously integral flat sheet metal ring seated in said groove in unit handling relation with the annular bearing member, a laterally disposed marginal reinforcing rim on said ring, an annular seal between the ring and said housing and between said ring and the bearing member, and clamping means passing through the ring and seal and removably secured to said housing; substantially as described.

THOMAS C. DELAVAL-CROW.